REMOTE CONTROL MIRROR

Original Filed Jan. 20, 1964 3 Sheets-Sheet 1

INVENTOR.
Andrew J. VanNoord
BY
Dale A. Winnie
ATTORNEY

REMOTE CONTROL MIRROR

Original Filed Jan. 20, 1964 3 Sheets-Sheet 2

INVENTOR
Andrew J. VanNoord
BY
Dale A. Winnie
ATTORNEY

REMOTE CONTROL MIRROR

Original Filed Jan. 20, 1964 3 Sheets-Sheet 3

INVENTOR
Andrew J. VanNoord
BY
Dale A. Winnie
ATTORNEY

United States Patent Office

Re. 27,172
Reissued Sept. 20, 1971

27,172
REMOTE CONTROL MIRROR

Andrew J. Van Noord, Grand Rapids, Mich., assignor to Kent Engineering, Grand Rapids, Mich.

Original No. 3,370,479, dated Feb. 27, 1968, Ser. No. 338,892, Jan. 20, 1964. Application for reissue Feb. 27, 1970, Ser. No. 15,306
Int. Cl. F16c *1/10*
U.S. Cl. 74—501M 21 Claims

Matter enclosed in heavy brackets [ ] appears in the original patent but forms no part of this reissue specification; matter printed in italics indicates the additions made by reissue.

ABSTRACT OF THE DISCLOSURE

A two-wire remote control mirror including a housing on a swivel base and having the mirror mount secured to the inside back wall of the housing from under the front edge of the mirror as tilted back for such purpose.

This invention relates to rear view mirrors and more particularly to remote control rear view mirrors for use on automotive vehicles and the like.

Many different types of remote control rear view mirrors have been proposed for use with automatic vehicles. These have included push-pull rods, rotatable shafts, gear means, combinations of these and still other means to accomplish the desired mirror head movement. The most practical is probably the flexible cable control means for mirror positioning wherein straight line access between the controls and the mirror is not necessary.

One of the principal difficulties in providing a remote control mirror acceptable to the trade has been to accommodate the means for mounting the mirror, and the control cables, within a housing having a relatively slim profile and which is therefore more attractive in appearance. Further, to accomplish this along with savings in production, assembly and installation costs since distinctively difficult mirror assemblies are required for each different style and make of car due to fixed mirror base shell designs.

In this latter regard, the rather surprising inability of anyone to devise a commercially acceptable swivel mount remote control mirror has hampered remote control sales to both original equipment manufacturers and the after market. Furthermore, it has made remote control mirrors for the passenger sides of vehicles very impractical to provide.

From the foregoing, some of the objects of this invention should be apparent; namely to eliminate in whole or at least in part some of the difficulties mentioned. To more clearly emphasize certain features of this invention, a list of a few specific objects may be helpful.

One of the principal objects of this invention is to provide a remote control rear view mirror which makes use of flexible cable controls and is simple and inexpensive in construction and highly attractive in appearance due to an exceptionally slim sideline profile.

Another object of this invention is to provide a relatively simple and inexpensive means of universal support for a mirror member which will lie in close spaced relation to the back thereof and may be used to retain the mirror within a housing which has minimum depth and is most attractive and uncluttered in appearance.

Another object of this invention is to provide relatively simple means for supporting a mirror within a housing and for accommodating and suitably guiding operative control cables so that they will also lie in close spaced relation to the back of the mirror member and in a manner unobstructively operative thereof.

Still another object of this invention is to provide a slim and attractive housing for a mirror which may be used for either a fixed or remotely positionable mirror and wherein he housing itself may be manually adjustable.

The more specific objects of this invention include providing an exceptionally small, simple and highly effective universal joint support for a mirror member which enables it to be secured in very close spaced relation to the inside back wall of a receptive housing. The support means may be preassembled to the back of the mirror and later secured unnoticeably to the inner back wall of the housing in the final assembly operations. Despite the simplicity of the mirror support member it is also notably formed to receive and properly guide control cable means for operative engagement with the mirror head parts in an unobstructive manner and one assuring positively responsive mirror control.

These and other objects and advantages to be gained in the practice of this invention will be better understood and appreciated upon a reading of the following specification in regard to a preferred embodiment and certain variations of the present invention having reference to the accompanying drawings wherein.

Figure 1:
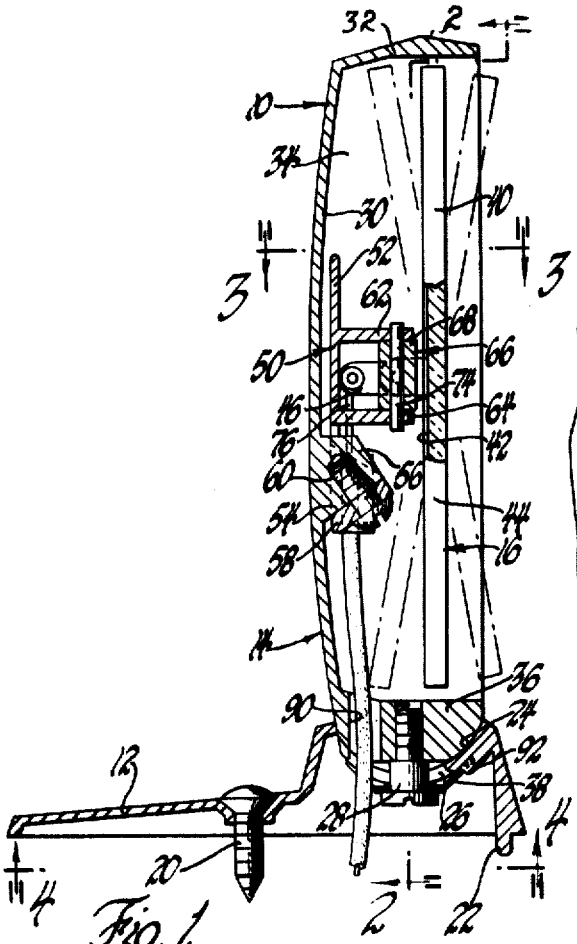
FIGURE 1 is a cross-sectioned elevational view of a remote control rear view mirror made in accord with the teachings of this invention.
Figure 2:
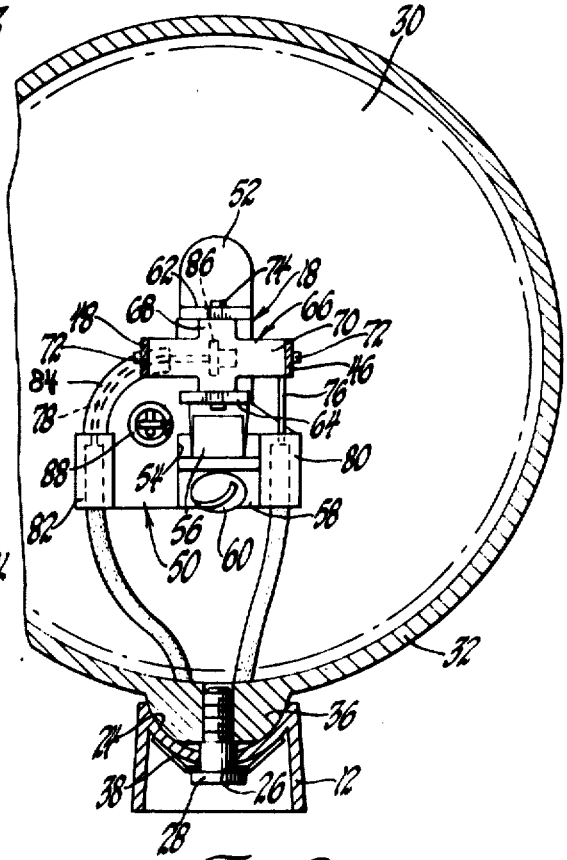
FIGURE 2 is an end and partially cross-sectioned view of the remote control mirror assembly shown by the first drawing figure as seen substantially in the plane of line 2—2 thereon.
Figure 3:
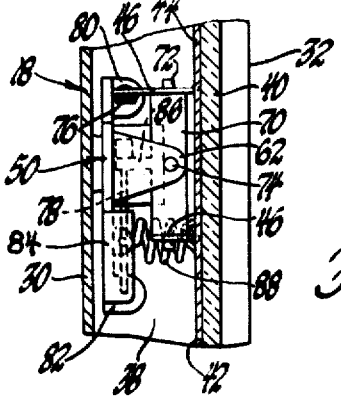
FIGURE 3 is a cross-sectional fragmentary plan view of the mirror and its support means as seen in the plane of line 3—3 in the first drawing figure.
Figure 4:
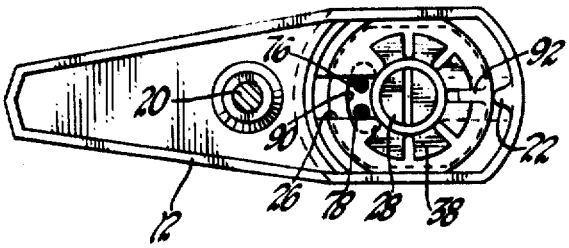
FIGURE 4 is a bottom plan view of the base of the mirror assembly shown in the first drawing figure as seen in the plane of line 4—4 thereon.

For a better understanding of the present invention, reference is first made to the remote control mirror assembly 10 shown by FIGURES 1–4.

The mirror assembly 10 includes a base member 12 such as would normally be secured to the side door or fender wall of an automative vehicle body. A mirror receptive housing 14 is supported on the base member 12 and a mirror 16 is provided within the housing. The mirror member 16 is received and supported for universal movement on support means 18 which are provided within the housing 14 and will subsequently be described in greater detail.

The base member 12 is of the conventionally known chrome plated and general teardrop shape. A sheet metal screw 20 and a positioning detent 22, relatively spaced from each other, are used to locate and fix the base member to a vehicle body wall where desired.

The base member 12 is also formed to include a concavity or spherical ball socket seat 24. Through the ball socket seat 24 is formed an elongated slot 26, extending lengthwise of the base member 12, and through which is extended a threaded fastener 28 for engagement with the mirror receptive housing 14 which stands over the base member and extends transversely thereacross.

The mirror receptive housing member 14 is circular in shape and, as mentioned, has the appearance of sitting on its edge and extending transversely across the base member 12. It includes a substantially plane surfaced, and just slightly convexed, back wall 30 and a rearwardly disposed peripheral or marginal annular flange 32. The back wall 30 and the marginal flange 32 of the housing define a rearwardly open recess or space 34 within which is received the mirror 16. The mirror receptive space 34 is of substantially the size and shape of the mirror member 16, with operative clearance, and is of a depth just sufficient to enable normal adjustment movements of the mirror.

The mirror housing 14 is mounted to the base member 12 by means of a spherical ball joint part 36 which is formed on the lower disposed outer side of the annular flange 32 and is receptive within the ball socket seat 24 of the base member. The screw fastener 28 extends through the socket seat slot 26 and into threaded engagement with the spherical ball joint part 36. As will be appreciated, the fastener 28 is formed with an unthreaded collar which rides in the socket slot 26. It will also be noted that a spring washer 38 is used to provide the required joint tension for wind resistance and reasonably easy manual positioning.

Other features of the housing swivel joint connection will be mentioned and described in some detail later.

The actual mirror member 16 is circular in shape, like the housing 14, and of a size receptive within the mirror space 34 of the housing as previously mentioned. The mirror 16 includes a glass member 40 with a reflective backing 42 and provided within a close fitting case 44. Rearwardly disposed and relatively spaced arms 46 and 48 are provided on the back of the mirror case 44. They may be struck from the back of the mirror case and bent outwardly or they may be otherwise provided thereon. They are substantially on diametrically opposite sides of the mirror center and are extended for engagement with the mirror support means 18.

Support means 18 includes a bracket member 50 which has a substantially flat back wall part 52 with an opening 54 provided near its lower edge. The opening 54 is receptive of a projection 56 but stands out from the housing wall 30 within the mirror receptive space 34. The lower side of the projection 56 is chamfered or beveled and the lower edge of the bracket wall, below the opening 54, is formed to include a web 58 which matches and is secured to the housing wall projection 56 by a screw fastener 60.

A pair of relatively spaced horizontal arms 62 and 64 are extended outward from the bracket wall 52. They are located about the bracket wall opening 54 and are intended to be disposed substantially centrally within the housing 14 when the bracket is mounted therein.

A cross arm member 66, including a vertical arm 68 and a horizontal arm 70, is received and retained between the mirror case arms 46 and 48 and the bracket arms 62 and 64. The ends of the horizontal arm 70 are formed to include pin ends 72 which are received in receptive openings in the mirror case arms 46 and 48. The vertical arm 68 is preferably engaged to the bracket arms 62 and 64 by a pivot pin 74.

A pair of flexible control cable wires 76 and 78 are used to adjust and control the mirror 16. They are shown disposed in protective sheaths which are not separately identified and are assumed to be commonly known. The sheathed ends of the control wires are received in receptive bores provided within embossments 80 and 82 on the front face of the bracket wall 52. The control wire 76 is bared and extended straight through the embossment 80 for engagement with the extended end of the mirror case arm 46. The control wire 78 is also bared and then threaded through an arcuate passage forming member 84, which is part of the support bracket 50, so that it extends transversely of the other control wire and for engagement with a relatively rearwardly disposed tab 86 on the cross arm member 66.

From the foregoing it will be appreciated that push-pull movement of the control cable wire 76 will cause oscillation of the mirror 16 about the axis of the horizontal cross arm 70. Like movement of the control cable wire 78 will cause pivotal movement of the mirror 16 about the axis of the vertical cross arm 68.

The control cable wires 76 and 78 may be used in both tension and compression to operate the mirror 16, but in some instances a biasing spring may be used to relieve or avoid the compressive load on the thin or flexible control cable wire. For example, biasing spring 88 is shown connected between the bracket 50 and the mirror case 44. The biasing spring is offset from both the horizontal and vertical axes of the cross arm member 66. The spring 88 is shown to bias the mirror in a cocked position which is cooperatively counteracted by the frictional drag of the two control cables.

The control cables 76 and 78 pass through an access passage 90 in the ball head part 36 of the housing flange 32. They extend from the passage through the elongated slot 26 in the socket seat 24 of the base support member 12. The spring washer 38 has the tang which would normally cover the cable passage 90 relieved to avoid interference with the cables. It is also designed to receive a positioning detent 92, formed on the underside of the socket seat 24, between a pair of the spring finger tangs so that it will not turn in use and accidentally bind or damage the control wire cables.

From the foregoing it will be appreciated that the mirror 16 is positionable on the universal joint support 18 within a very shallow housing 14 and that full remote control of the mirror is affected by a single pair of wires readily and unobstructively received in the narrow space between the back of the mirror and the back of the mirror receptive housing.

The mirror supporting bracket 50 is secured to the back of the mirror case 44. The control cables 76 and 78 are threaded through the receptive passages in the preassembled base and housing and are then engaged to the bracket and mirror. The mirror is next placed in the housing with the opening in the bracket wall receiving the projection 56 formed on the backwall of the housing therethrough. The top of the mirror is tilted back into the housing, causing the bottom to extend just slightly outside the housing and to provide access therebehind to the bracket fastening screw 60.

The control cables 76 and 78 may be extended to wherever they may be best used and attached to suitable cable operating means (not shown).

The mirror housing 14 is manually adjusted to the general position desired and thereafter the control wires will position the mirror in the housing for whatever precise viewing angle is desired.

The same housing 14 may be modified to receive a fixed mirror therein. Since the housing itself is adjustable on the base 12, a conventionally known mirror having the same styling appearance may be made from the same parts.

Figure 5:
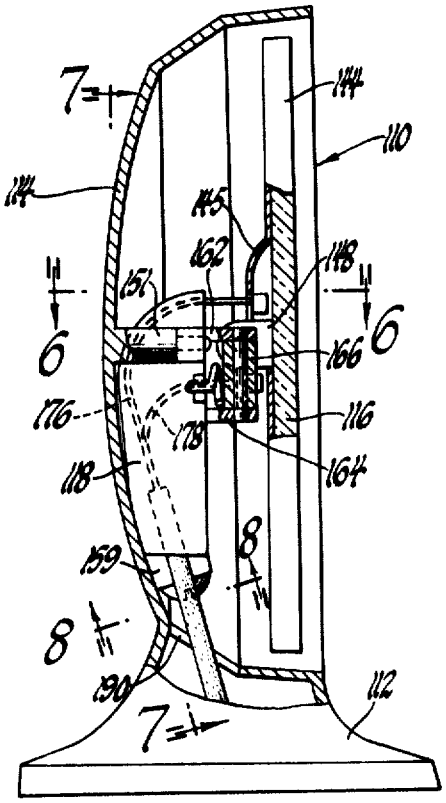
FIGURE 5 is a partially cross-sectioned elevational view of another remote control rear view mirror embodying certain features of this invention.
Figure 6:
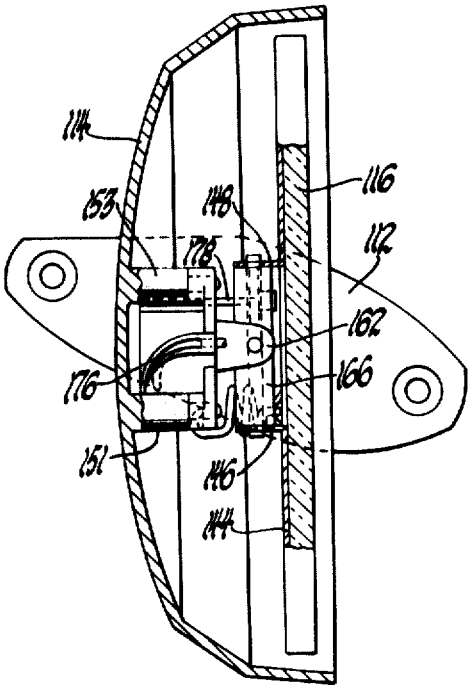
FIGURE 6 is a cross-sectioned top plan view of the remote control mirror assembly shown by the last mentioned drawing figure as seen in the plane of line 6—6 thereon.
Figure 7:
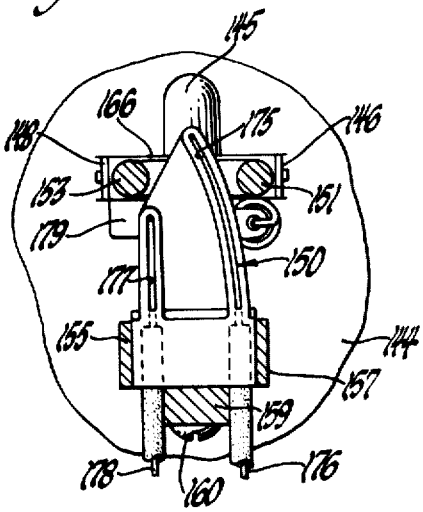
FIGURE 7 is an inside end view of the mirror support means of the mirror assembly shown by FIGURE 5 as seen substantially in the plane of line 7—7 thereon.
Figure 8:
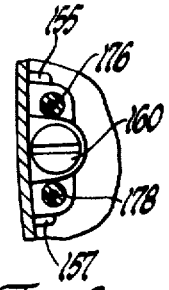
FIGURE 8 is a fragmentary detail as seen in the plane of line 8—8 from drawing FIGURE 5.

Referring now to FIGS. 5–8:

Where appropriate and proper, liker reference numerals with a distinctive prefix numeral are used to identify parts having a similarity of structure or purpose to parts previously described. Like reference numerals are used to show like parts used for the same purpose. This correlation of reference numerals is for a continuity of discussion without an unnecessary repetition of descriptive details.

The mirror assembly 110 includes a one piece base 112 and housing 114. The mirror 116 is mounted in the housing on a support 118.

The mirror support 118 includes a bracket 150 having a pair of horizontal disposed and vertically spaced arms 162 and 164 which are receptive of a cross arm universal joint member 166 in trunnion support therebetween. The other cross arm of the member 166 is engaged to a pair of vertically disposed and horizontally spaced arms 146 and 148 which are provided on the back of the mirror case 144.

A pair of control wire cables 176 and 178 are received through the bracket 150 in slotted passageways 175 and 177, to a position normal to the mirror 116. The control wire 176 is engaged to a tab 145 struck from the mirror case 144 to afford control movement about the horizontal axis of the cross arm member 166. The control wire 178 is engaged to a web 179 provided between the arms of the cross arm member 166 and offset from the vertical axis, to affect pivotal movement about the vertical axis.

A suitable opening 190 is provided between the base and housing for the passage of the control wire cables 176 and 178 and for access to the retainer screw 160 which anchors the bracket 150 to the inner backwall of housing 114. A pair of spaced projections 151 and 153 with locator pins provided on the ends thereof, guide walls 155 and 157, and a bracket supporting projection 159 serve to receive and center the bracket 150 on the back wall of the housing.

Figure 9:
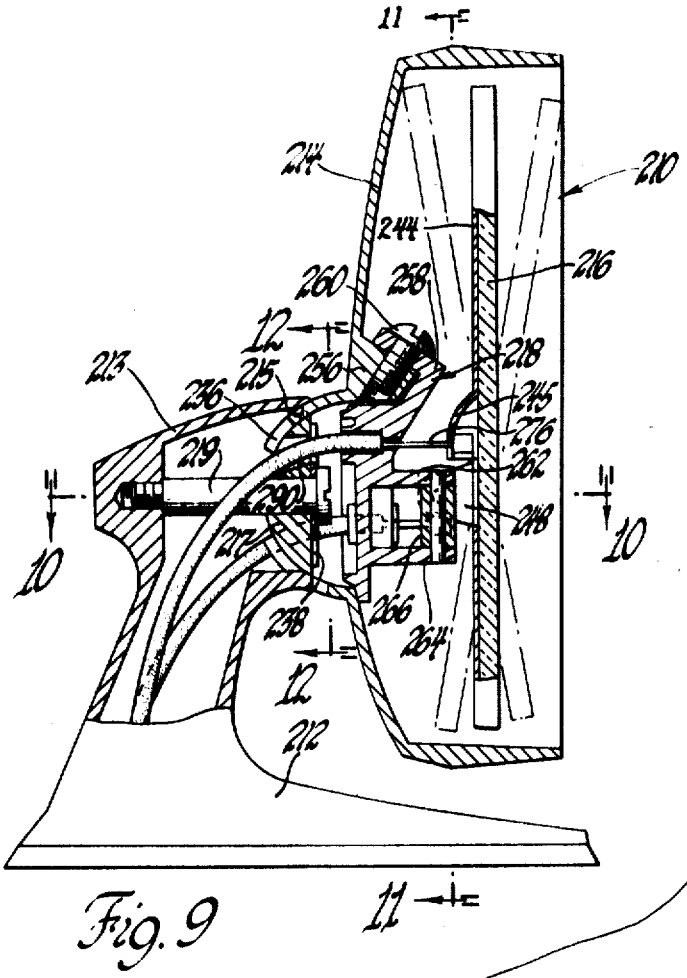
FIGURE 9 is a partially cross-sectioned elevation view of another remote control mirror assembly made in accord with certain teachings of this invention.
Figure 10:
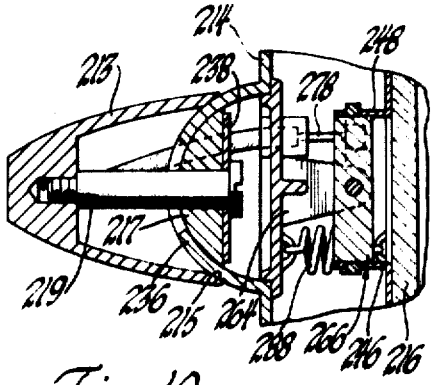
FIGURE 10 is a top plan cross-sectional view of the mirror assembly shown by the last mentioned drawing figure as seen in the plane of line 10—10.
Figure 11:
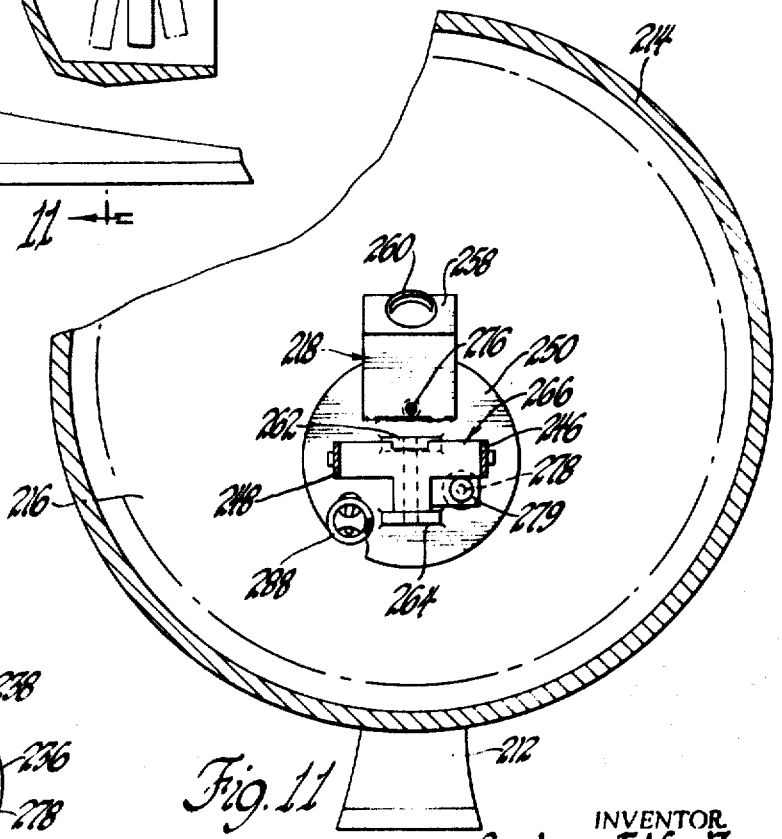
FIGURE 11 is a cross-sectional view of the mirror assembly shown by drawing FIGURE 9 in the plane of line 11—11 and looking into the mirror housing.
Figure 12:
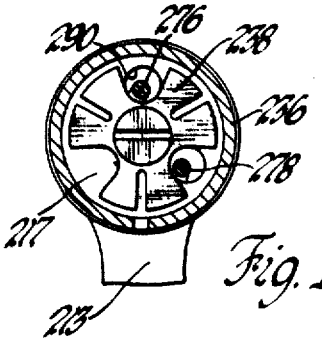
FIGURE 12 is a cross-sectional detail of the mirror support as seen substantially in the plane of line 12—12 in drawing FIGURE 9, looking in the direction of the arrows thereon.

Referring now to FIGURES 9–12:

Mirror assembly 210 includes a base 212 which has an upwardly and rearwardly disposed gooseneck part 213 to which is secured a housing part 214 receptive of a mirror 216 therein. The mirror 216 is mounted on a support 218 provided in the housing shell.

The rearwardly disposed part of the gooseneck extension 213 is formed to provide an opening 215 within which is received and rotatably journalled a ball head projection 236 formed from the back side and eccentrically of the housing 214. A convex member 217 is fitted in the concave side of the housing wall projection and is retained by a fastener 219 and biased by a spring washer 238.

Control cables 276 and 278 are received through the hollow base support 212, centrally through the ball head projection 236 on the back of the mirror housing, through passages 290 in the member 217, between tangs of the spring washer 238, and through the bracket 250 provided in the back wall of the housing for control engagement with the mirror 216.

The bracket 250 includes a pair of horizontally disposed and vertically spaced arms 262 and 264 which cooperate with a pair of vertically disposed and horizontally spaced arms 246 and 248 provided behind the back of the mirror 244 and receiving and supporting a cross arm universal joint member 266 therebetween. The control cables 276 and 278 are received through the bracket member and are respectively engaged to a tab 245 on the back of the mirror case and offset from the horizontal axis, and to a web 279 provided on the cross arm member 266, and offset thereon from the vertical axis, for universal control movement of the mirror as in the previously described mirror assembly units. A mirror head biasing spring 288 is secured between the back of the mirror and the backwall of the bracket member 250 at a position offset from both pivotal axes of the cross arm member 266 in a manner to balance the pull of the operating cables.

The bracket 250 is formed to provide a shoulder flange 258 which is engaged to a housing wall projection 256 and secured by a fastener 260. The bracket is centered in the ball head opening of the housing and positively located relative thereto. The eccentric mounting of the mirror enables the upper edge to be moved out of the housing sufficiently to provide access to the fastener 260.

The bracket 250 may be disposed to provide the pivotal center of the mirror at the pivotal center of the housing shell since the one is within the sphere of the other.

As with the mirror assembly 10 first described, essentially the same base, housing shell and mirror components may be used to provide a fixed and manually adjustable rear view mirror having the same styling appearance, if desired. A different type of support for a fixed mirror would be provided (not shown) and the control cables would be eliminated.

I claim:

1. A remote control rear view mirror, comprising;

a housing having a rearwardly disposed opening, a remotely controllable mirror member received in said housing and closing said opening, *remotely actuated motion transmitting means operatively connected to said mirror member,* a member having said mirror positively engaged thereto for pivotal support about transverse axes, and means accessible through said opening for securing said pivotal support member to said housing behind said mirror member as tilted in said housing opening for such purpose.

2. The remote control mirror of claim 1, said support member being secured to said housing apart from the engagement of said mirror member therewith and closer to a side edge of said housing for easier access thereto behind said mirror.

3. The remote control mirror of claim 1, said housing having an access opening provided therethrough for control cable access to said mirror and having said fastening means disposed accessibly relative thereto.

4. The remote control mirror of claim 1, including means engaging a side wall of said housing for supporting said housing for pivotal movement independent of said mirror member and including with said housing complementary parts of a ball and socket pivotal connection therebetween.

5. The remote control mirror of claim 4, said housing supporting means being formed to include a passageway extending through said ball and socket parts and having mirror operating cable means extending therethrough, *and connected to said motion transmitting means.*

6. The remote control mirror of claim 4, said housing supporting means having cable means operative of said mirror passing therethrough, *and connected to said motion transmitting means.*

7. Means for supporting a mirror member in a receptive housing for remote control actuation, and comprising;

a member including means of pivotal engagement to the back side of a remote control mirror, said member having a portion and fastening means received therethrough from the side next adjacent the back of the mirror for fixed engagement of said member within said mirror receptive housing, and control cable guide passages provided through said member for actuation of the mirror member.

8. The mirror support of claim 7, including, means provided on said pivotal member and separate from said pivotal engagement means for biasing said mirror in opposition to cable control actuation thereof.

9. The mirror support of claim 7, said *portion* [back wall] being extended and said means of fixed engagement being received therethrough at an angle commensurate with the pivotal movement afforded the remote control mirror in the receptive housing to permit access thereto.

10. The mirror support of claim 7, said means of pivotal engagement including a trunnion supported crossed arm member having at least one arm thereof formed for control cable engagement therewith.

11. A remote control rear view mirror, comprising;

a housing having a mirror member received and supported therein for controlled movement independent of said housing, cable means connected to said mirror member and operative from a remote location for positioning said mirror in said housing, and means engaging a side wall of said housing for supporting said housing for movement and including passage means receptive of said cable means unobstructively therethrough.

12. The remote control mirror of claim 11, said housing supporting means including a ball and socket joint including spring washer tensioning means relieved for the passage of said cable means therethrough.

13. The remote control mirror of claim 12, said spring washer tensioning means being relatively immovably disposed in said ball and socket joint.

*14. A remote control rear view mirror according to claim 1, wherein said support member and said mirror member are engaged and held together by pivot means for obtaining movement about said transverse axes.*

*15. A remote control rear view mirror according to claim 1, wherein said transverse axes are comprised of pivot members respectively interconnecting said mirror member and said pivotal support member.*

*16. A remote control rear view mirror according to claim 1, wherein said means for securing said pivotal support member to said housing is effective to cause operative engagement between said support member and including a mounting surface formed in said housing for precluding relative twisting movement between said support member and said mounting surface.*

*17. A remote control rear view mirror according to claim 1, wherein said means for securing said pivotal support member comprises at least one threadable fastener means received through a portion of said pivotal support member and threadably engages with a mounting surface formed in said housing, said fastener means being received through said portion at a point thereof eccentrically disposed with respect to the central axes of the mirror.*

*18. A remote control rear view mirror according to claim 1, wherein said securing means comprises a screw fastener and means precluding the twisting of said support member in said housing, said means precluding said twisting being separate and apart from said screw fastener.*

*19. A rear view mirror, comprising; a housing having a rearwardly disposed opening, a mirror member received in said housing and closing said opening, a member having said mirror engaged thereto for pivotal support about transverse axes, and means accessible through said opening for securing said pivotal support member to said housing behind said mirror member as tilted in said housing opening for such purposes.*

*20. A rear view mirror, comprising; a housing having a rearwardly disposed opening, a mirror member received in said housing and closing said opening, a member having said mirror engaged thereto for pivotal support, and means accessible through said opening for securing said pivotal support member to said housing behind said mirror member as tilted in said housing opening for such purpose.*

*21. A remote control rear view mirror, comprising; a housing having a rearwardly disposed opening, a remotely controllable mirror member including motion transmitting means operatively connected to said mirror member received in said housing and closing said opening, a member having said mirror engaged thereto for pivotal support, and means accessible through said opening for securing said pivotal support member to said housing behind said mirror member as tilted in said housing opening for such purpose.*

References Cited

The following references cited by the Examiner, are of record in the patented file of this patent or the original patent.

UNITED STATES PATENTS

| | | | |
|---|---|---|---|
| 2,629,286 | 2/1953 | Budreck | 248—483 |
| 3,183,736 | 5/1965 | Jacobson | 74—501 |
| 3,191,498 | 6/1965 | Priebe | 74—501UX |
| 3,198,071 | 8/1965 | Gosling | 74—501 |

MILTON KAUFMAN, Primary Examiner

U.S. Cl. X.R.

248—487

Dedication

Re. 27,172.—*Andrew J. Van Noord,* Grand Rapids, Mich. REMOTE CONTROL MIRROR. Patent dated Sept. 20, 1971. Dedication filed Dec. 29, 1980, by the inventor.

Hereby dedicates to the Public the entire term of said patent.

[*Official Gazette May 26, 1981.*]